United States Patent [19]

Otto

[11] 4,195,098
[45] Mar. 25, 1980

[54] METHOD OF PREPARING BACON SLABS FOR SLICING

[75] Inventor: Carl W. Otto, Narrangansett, R.I.

[73] Assignee: Airco, Inc., Montvale, N.J.

[21] Appl. No.: 910,918

[22] Filed: May 30, 1978

[51] Int. Cl.² ............................................. A23L 3/36
[52] U.S. Cl. ................................. 426/513; 426/518; 426/524
[58] Field of Search ............... 426/641, 645, 418, 513, 426/518, 519, 524; 62/62, 63, 64, 65

[56] References Cited

U.S. PATENT DOCUMENTS

| | | | |
|---|---|---|---|
| 2,119,716 | 6/1938 | McKee | 426/513 X |
| 2,329,226 | 9/1943 | Stafford et al. | 62/64 |
| 2,860,056 | 11/1958 | Bradford | 426/524 X |
| 2,937,097 | 5/1960 | Draudt et al. | 426/315 X |
| 3,055,760 | 9/1962 | Morrison | 426/524 |
| 3,220,854 | 11/1965 | Zwart | 426/641 X |
| 3,240,026 | 3/1966 | Van Dolah et al. | 62/63 X |
| 3,468,135 | 9/1969 | Doll et al. | 62/63 |
| 3,492,831 | 2/1970 | Maurer et al. | 426/524 X |
| 4,028,774 | 6/1977 | Allan et al. | 426/524 X |

*Primary Examiner*—Arthur L. Corbin
*Attorney, Agent, or Firm*—David L. Rae; Larry R. Cassett; Edmund W. Bopp

[57] ABSTRACT

Bacon slabs are prepared for slicing by removing slabs from a smokehouse at a temperature of approximately 120° F. and cooling the same in two stages with an intervening equalization stage. In the first cooling stage, bacon slabs are reduced to an average temperature of between 45°–50° F. in less than approximately 30 minutes and subsequently held under a substantially constant temperature of approximately 40°–45° F. for a period of about 25–30 minutes to substantially equalize the temperature throughout the slabs. Subsequently, the slabs are further cooled to an average temperature of approximately 22°–26° F. in a period of up to approximately 30 minutes before being molded for slicing at a temperature in the range of about 24°–28° F.

9 Claims, 1 Drawing Figure

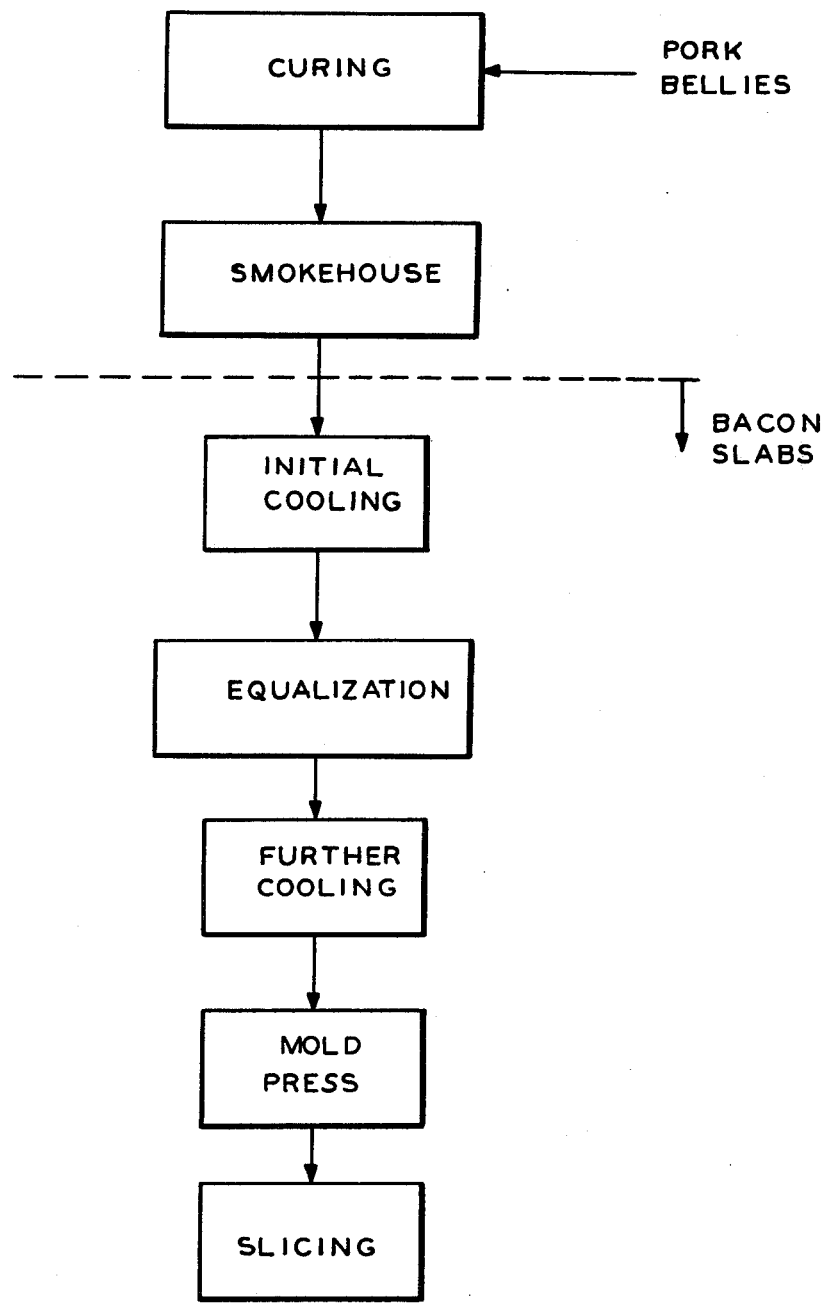

METHOD OF PREPARING BACON SLABS FOR SLICING

BACKGROUND OF THE INVENTION

In order to produce bacon suitable for retail sales, pork bellies are cured by injecting or otherwise adding a salt containing fluid thereto. The purpose of curing pork bellies is to retard bacterial action and thus preserve the product. Subsequently, the cured pork bellies are transferred to a smokehouse in which the bellies remain typically for periods of four hours or more. Such smoking tends to retard fat oxidation and imbues the pork bellies with a characteristic flavor and color. Pork bellies which have been subjected to curing and smoking operations are generally referred to as bacon slabs and typically, such slabs weigh between 10-18 lbs. The bacon slabs are then cooled from the smokehouse temperature of approximately 120° F. to a temperature of about 22°-28° F. before being inserted into a mold press. The slabs are molded into a substantially solid rectangular shape in such a press as this shape is particularly suitable for efficient slicing. The resulting bacon is sliced at a temperature of about 24°-28° F. and the slices are then packaged in accordance with conventional techniques for retail sale.

In order to properly cool bacon slabs so that slicing is readily facilitated, several prerequisites must be met. Initially, the cooling operation must not result in the physical impairment or deterioration of the bacon slabs such as the tearing of lean from fat tissue. In addition, weight loss of bacon slabs undergoing a cooling operation must be controlled and the cooling must be essentially uniform throughout the slabs. Uniform cooling of bacon slabs has been heretofore difficult to accomplish due to the fact that the slabs are thinner (approximately 1 inch) at one end thereof while being substantially thicker (approximately 2 inches) at the other end. Previously, satisfactory cooling has been achieved but usually only over relatively long periods (8-24 hours or greater) which increases the capital cost of cooling and storage facilities as well as the inventory of bacon in a given plant. Previous bacon preparation processes have resorted to batch type operations which require more extensive product handling and consequently higher costs.

In typical prior art bacon cooling processes, slabs are removed from the smokehouse at temperatures of approximately 120° F. and are placed in refrigerated chambers to reduce the average bacon temperature to approximately 40° F. over a period of up to 24 hours. Subsequently, the partially cooled bacon slabs are placed in another refrigerated chamber to further reduce the average temperature of slabs to approximately 24° F., again over a relatively long period of up to 24 hours. At this point, the cooled bacon slabs may be molded for slicing. In order to substantially reduce the time necessary for cooling bacon from smokehouse temperatures to approximately 24°-28° F., other prior art processes have included the steps of subjecting bacon slabs removed from the smokehouse directly to intense refrigeration, preferably by direct contact with or immersion in a liquefied gas such as liquid nitrogen and permitting bacon slab temperatures to equalize at approximately 24° F. Such a technique is described in U.S. Pat. No. 3,055,760. By contacting bacon slabs with liquid nitrogen which is typically supplied at a temperature of −320° F., a quick-chilling of the slabs occurs and consequently, the outer layers or crust of the slab is frozen (reduced in temperature substantially below 20° F.). By permitting the so-cooled bacon slabs to equilibrate for two hours or less in a zone maintained at a temperature of approximately 26° F., the temperature throughout the bacon slab tends to approach this value. One serious disadvantage with the aforementioned quick cooling process is that by subjecting bacon slabs to such intense refrigeration, the freezing thereof results in a physical separation of the fat from lean bacon portions and consequently, less than desirable bacon slices are obtained from slicing operations.

Accordingly, a clear need exists for a process for preparing bacon slabs for slicing wherein the slabs are cooled from smokehouse temperatures to preferred slicing temperatures in an essentially continuous or semi-continuous manner and in a time period of approximately 2-3 hours or less without impairing the physical characteristics of the bacon slabs or the resulting appearance of sliced bacon.

OBJECTS

It is an object of the present invention to provide improved methods of preparing bacon slabs for slicing.

It is another object of the present invention to provide improved methods for rapidly cooling bacon slabs removed from a smokehouse to slicing temperature without impairing the physical characteristics of such slabs.

It is a further object of the present invention to provide improved methods for preparing bacon slabs for slicing in an essentially continuous or semi-continuous process.

It is still another object of the present invention to provide improved methods for cooling bacon slabs wherein the weight loss during cooling is substantially minimized.

It is yet a further object of the present invention to provide improved methods for cooling bacon slabs from a temperature of 90° F. or greater to an equalized slab temperature of approximately 22°-26° F. within a period of approximately 2-3 hours or less without freezing portions of the slabs.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, a method of preparing bacon slabs for slicing at a temperature of approximately 24°-28° F. comprises the steps of placing the bacon slabs at a temperature of 90° F. or greater in heat exchange relation with a cooling medium for a period of not more than about thirty minutes to reduce the heat content thereof to an average slab temperature of between approximately 45°-50° F., holding said cooled bacon slabs in a substantially constant temperature environment of approximately 40°-45° F. for a period of approximately 25-30 minutes to substantially equalize the temperature throughout the bacon slabs, placing the bacon slabs in heat exchange relation with a cooling medium for a period of up to about 30 minutes to reduce the heat content of such slabs to an average slab temperature of approximately 22°-26° F., and thereafter molding the further cooled slabs to prepare the same for slicing at a temperature of approximately 24°–28° F. In its broadest aspects, the present invention relates to a method for cooling bacon slabs from smokehouse to slicing temperature within approximately 2–3 hours and without physically impairing the structure of such slabs by utilizing two cooling steps with an intervening equalizing step at a temperature of approximately 40°–45° F. The cooling medium may comprise any suitable known refrigerant such as carbon dioxide, controlled quantities of liquid nitrogen, chilled air or refrigeration may simply be provided by conventional mechanical condenser-evaporator equipment. Preferably, the same cooling medium, e.g. carbon dioxide, is utilized in each cooling step although different cooling media may be utilized in such steps. The particular structure utilized to provide the necessary cooling may comprise a single insulated enclosure or belt tunnels, spiral belt cooling devices or other mechanisms adapted to pass slabs through a zone into which a cooling medium is dispensed so as to effect the necessary temperature reductions. The equalization zone may comprise an insulated enclosure or a belt tunnel maintained at a temperature of approximately 40°–45° F. The two cooling steps and the intervening equalizing step are preferably arranged to enable continuous or semi-continuous, as opposed to batch, cooling thereby improving the operating economics of the process for preparing bacon slabs according to the present invention. Depending upon the size of slabs being cooled, the refrigeration required (hence, temperature) in each cooling zone is varied to enable necessary slab temperature reductions in substantially constant residence times. Also, a single insulated enclosure may be utilized for effecting the cooling and equalizing steps in lieu of a plurality of belt tunnels or spiral belt cooling devices.

BRIEF DESCRIPTION OF THE DRAWING

The invention will be more clearly understood by reference to the following description of exemplary embodiments thereof in conjunction with the following drawing in which the sole FIGURE is a diagrammatic view of the stages of the method for preparing bacon slabs in accordance with the present invention.

DESCRIPTION OF PREFERRED EMBODIMENT

Referring now to the FIGURE, illustrated therein is a diagrammatic outline of the steps according to the present invention which steps include the curing of fat pork bellies, the smoking of cured pork bellies to produce bacon slabs, an initial cooling of such slabs, an equalization of the temperature substantially throughout the so-cooled slabs, further cooling of the bacon slabs to a slicing temperature, molding the further cooled slabs and finally, slicing the slabs into strips of bacon. In accordance with the present invention, pork bellies are cured by injecting a salt containing fluid (curing agent) therein in a manner well known to those skilled in the art. It has been found that by utilizing fluid injecting machines, such as Model 1200 manufactured by Townsend Engineering, Des Moines, Iowa, adequate injection of pork bellies will be obtained. The injected pork bellies are subsequently transported to a smokehouse wherein the bellies are subjected to smoke to impart a characteristic flavor and color in addition to retarding fat oxidation. Typically, injected pork bellies are retained in a smokehouse for a period of approximately 4 hours or more at temperatures of approximately 120° F. or greater thereby curing the same and are then either water or ambient cooled outside the smokehouse to a temperature of approximately 90° F. Typically, such cooling may be effected by spraying water onto bellies retained on racks and subsequently permitting ambient cooling to occur to reduce the bacon slab temperatures to approximately 90° F. in about two hours or so. However, such cooling (to 90° F.) is not a prerequisite to successful practice according to the present invention. At this point, the bellies (which hereinafter are referred to as bacon slabs) are in condition to be prepared for slicing and the necessary steps to effect this preparation in accordance with the present invention will now be described.

The bacon slabs are subjected to an initial cooling by placing the slabs in heat exchange relation with a cooling medium for a period of not more than 30 minutes to cool such slabs to a heat content corresponding to an average slab temperature of approximately 45°–50° F. Conventional cooling devices such as an insulated enclosure having a plurality of racks or "trees" for holding slabs placed thereon may be utilized to reduce the average slab temperature mentioned immediately above. Typically, such racks may be mounted on motorized carriages which travel along rails into and out of such enclosures. Alternately, the slabs may be passed through a belt tunnel or spiral belt cooling device which equipment is well known to those skilled in the art. For example, tunnels are manufactured and sold by the assignee of the present invention under Model No. KFT and spiral belt cooling devices are also available from this source under Model No. KF-9. Preferably, the cooling medium utilized to initially cool bacon slabs is carbon dioxide which is introduced into the insulated enclosure, tunnel or spiral belt cooling device by passing liquid carbon dioxide through a nozzle to thereby convert such liquid to solid carbon dioxide and $CO_2$ gas. Preferably, fans are provided to preclude substantial accumulation of solid $CO_2$ on the floor of such enclosure, and thus assure the effective use of this refrigerant. By utilizing conventional temperature control equipment, the temperature within the particular cooling device may be maintained at predetermined values, and in accordance with the present invention, a temperature of approximately −25° F. to −50° F. is suitable depending on the size (thickness) of the slabs being cooled.

It will be understood that the residence time of bacon slabs in the cooling equipment will be sufficient to enable the removal of enough heat from such slabs to reduce the "average" temperature thereof to approximately 45°–50° F. in a period of up to about thirty minutes. By utilizing a cooling device wherein the temperature thereof is maintained at approximately −25° to −50° F., sufficient heat removal from the slabs will occur from heat exchange between the cooling medium and slabs so as to reduce the average slab temperature to about 45°–50° F. without encountering the problems of slab freezing and the physical deterioration which results from the use of highly cryogenic (−320° F. or so) temperatures. In order to maintain uniform production rates, it is preferred to maintain the residence time of slabs in the cooling device substantially constant (about 30 minutes) and to satisfy varying heat loads presented by slabs of different sizes by controlling temperature in, or refrigeration supplied to, the cooling devices. Thus, lower temperatures are maintained in the cooling devices when heavy slabs are being cooled than when lighter slabs are cooled. In this initial cooling stage, temperature conditions are established such that for a given slab size and residence time in a cooling device freezing of the slabs, i.e. the temperature reduction of bacon slabs below 20° F., is avoided. Furthermore, by utilizing the aforementioned cooling (or similar) equipment, the initial cooling of bacon slabs may be rendered substantially continuous thereby improving the economics of the process for preparing bacon in accordance with the present invention.

Use of carbon dioxide is preferred as a refrigerant in the course of cooling slabs by the method according to the invention for the reason that less weight loss occurs from use of carbon dioxide than normally occurs from the use of mechanical refrigeration. As reductions in weight loss can represent significant annual savings in large bacon processing plants, such use of carbon dioxide is economically preferable. However, other refrigerants as mentioned heretofore may be utilized to cool bacon slabs by the process according to the invention.

After the bacon slabs are subjected to an initial cooling as mentioned above, the slabs are held in a substantially constant temperature environment at a temperature of approximately 40°-45° F. to cause the temperature of the slabs to be equalized substantially completely through each slab. Although the initial cooling of bacon slabs will reduce the "average" temperature to approximately 45°-50° F. as mentioned above, it is clear that the outer or exterior portions of the slab will reach lower temperatures (e.g. 25°-35° F.) than will the interior, central portions (e.g. 70°-80° F.) during such cooling. It has been found that by so holding bacon slabs for periods of up to about 30 minutes or so, heat is removed from the central portions toward exterior portions and the temperature of the slabs will be equalized substantially therethrough although the retention of such slabs in this equalizing stage will not be sufficiently long as to render the process according to the invention uneconomical. The equalization stage may be the same insulated enclosure utilized for initial slab cooling or a tunnel having a continuous belt or the like wherein the temperature range of about 40°-45° F. is maintained. In the event such an insulated enclosure is utilized for temperature equalization, refrigeration will be interrupted although some heat will be transferred from the slabs to the interior of the enclosure during equalization. In addition, the bacon slabs may be maintained under an inert atmosphere (e.g. carbon dioxide gas) during equalization to retard the growth of bacteria which would otherwise tend to shorten the overall shelf life of bacon sliced from such slabs.

Upon equalization of the temperature of bacon slabs at approximately 40°-45° F. as mentioned above, the slabs are subjected to further cooling by placing the same in heat exchange relation with a cooling medium for periods or residence times of up to about 30 minutes or so to reduce the heat content of the bacon slabs to correspond to an average slab temperature of approximately 22°-26° F. This further cooling of the bacon slabs to slicing temperature is preferably effected in cooling devices such as the insulated enclosure, a refrigeration tunnel or spiral belt cooling device as described above. During this cooling the temperature is maintained approximately 15° F. cooler than the temperature in the cooling device during the initial cooling. The reason for maintaining this lower temperature during further cooling is to assure that the rate of heat removal from the bacon slabs is adequate to cool the slabs from approximately 40°-45° F. to an average slab temperature of approximately 22°-26° F. within a period of up to about 30 minutes. Again, residence time of the slabs in the cooling device is maintained essentially constant and varying heat demands are met by temperature control as mentioned above. Also, freezing of the bacon slabs during the further cooling stage is avoided as is the deterioration of the physical characteristics of the bacon. Accordingly, as such freezing is avoided during the preparation of bacon in accordance with the present invention, the bacon slabs are, upon completion of the further cooling stage, ready to be molded in a conventional mold press and sliced in the normal manner. If desired, the slabs may be tempered at temperatures of about 24°-28° F. either before or after molding for predetermined periods of time.

Thus, the method of preparing bacon slabs in accordance with the invention enables the cooling of bacon slabs in an overall time period comparable to the time period necessary to cool bacon slabs with a cryogenic medium such as liquid nitrogen but yet avoids the physical impairment of bacon slabs attendant to the latter cooling processes. Also, the method according to the present invention enables an essentially continuous cooling of bacon slabs in substantially shorter time intervals than is commonly utilized with one to two day cooling processes and yet enables the preparation of bacon slabs for slicing with the resulting sliced bacon being suitable for retail sale.

It will be understood that cooling of bacon slabs may be rendered substantially continuous by the process according to the invention described above, as particular processors may find it economical to cool bacon in a semi-continuous manner depending upon the capacity of the smokehouse, mold press and slicing equipment at a given plant. For example, if green bellies are normally smoked for a 6 hour period, such bellies may be loaded into and removed from three sections of the smokehouse at two hour intervals. Cooling of slabs in accordance with the method of the present invention will typically consume 2 hours or so after which cooled slabs may be passed to a mold press or tempered as desired before slicing. By sequentially cooling (in an insulated enclosure) portions of a complete smokehouse inventory of slabs, such slabs are prepared for slicing in a 'semi-continuous' fashion which may be desirable in so far as insulated containers generally require lower capital investment than does a series of belt tunnels or spiral freezers. However, the particular cooling devices which may be best suited to a given bacon processing plant will still be operated to cool slabs for two periods up to about 30 minutes each with an intervening equalization period of similar duration without freezing of the slabs.

The foregoing and other various changes in form and details may be made without departing from the spirit and scope of the present invention. Consequently, it is intended that the appended claims be interpreted as including all such changes and modifications.

What is claimed is:

1. A method of preparing bacon slabs for slicing comprising the steps of cooling said slabs from a temperature of at least 90° F. to an average temperature of about 45°-50° F. thereby avoiding physical separation of the fat from the lean portions in said slabs, holding said cooled slabs under a temperature of about 40°-45° F. to substantially equalize temperature throughout said cooled slabs; further cooling said slabs to an average slab temperature of approximately 22°-26° F. without freezing said slabs and thereafter molding said further cooled slabs for slicing.

2. The method as defined in claim 1 wherein said step of holding said slabs includes holding said slabs for a residence time of up to about 30 minutes such that temperature at the interior and exterior slab portions are substantially equalized.

3. The method as defined in claim 2 wherein said step of holding said slabs includes holding said slabs in an inert atmosphere.

4. The method as defined in claim 1 wherein said step of cooling said slabs comprises retaining said slabs in a cooling zone having a temperature of approximately $-20°$ to $-50°$ F. for a residence time of up to about 30 minutes.

5. The method as defined in claim 1 additionally comprising the step of controlling the residence times of said slabs in said cooling and further cooling steps such that the average temperature of said slabs is reduced to about 45°–50° F. and 22°–26° F., respectively.

6. The method defined in claim 1 additionally comprising the step of tempering said slabs after said further cooling thereof and before said further cooled slabs are molded.

7. The method defined in claim 1 wherein the cooling, holding and further cooling steps are effected in a single insulated enclosure.

8. The method as defined in claim 1 wherein said cooling medium is carbon dioxide and said cooling and further cooling steps each include introducing liquid carbon dioxide into corresponding cooling and further cooling devices to convert said liquid carbon dioxide to its solid and gaseous phases.

9. A method of preparing bacon slabs at a temperature of about 90° F. or greater for slicing at a temperature of approximately 24°–28° F. comprising the steps of placing said bacon slabs in heat exchange relation with a cooling medium for a period of not more than about 30 minutes to reduce the average slab temperature to approximately 45°–50° F. thereby avoiding physical separation of the fat from the lean portions in said slabs; holding said slabs under a substantially constant temperature of approximately 40°–45° F. for a period of approximately 25–30 minutes to substantially equalize temperature throughout said slabs; placing said slabs in heat exchange relation with said cooling medium for a period of up to about 30 minutes to reduce the average temperature of said slabs without freezing said slabs to approximately 22°–26° F.; and thereafter molding said further cooled slabs to prepare said slabs for slicing.

* * * * *